United States Patent [19]

Buchal et al.

[11] Patent Number: 5,282,260
[45] Date of Patent: Jan. 25, 1994

[54] OPTICAL WAVEGUIDE COMPONENT AND FORMED WITH RARE EARTH IONS

[75] Inventors: Christoph Buchal, Jülich; Wolfgang Sohler, Paderborn, both of Fed. Rep. of Germany

[73] Assignee: Forschungszentrum Julich GmbH, Julich, Fed. Rep. of Germany

[21] Appl. No.: 934,963

[22] Filed: Aug. 25, 1992

Related U.S. Application Data

[62] Division of Ser. No. 627,809, Dec. 14, 1990, Pat. No. 5,174,876.

[30] Foreign Application Priority Data

Dec. 18, 1989 [DE] Fed. Rep. of Germany ....... 3941704
Jul. 11, 1990 [DE] Fed. Rep. of Germany ....... 4022090

[51] Int. Cl.$^5$ .................................................. G02B 6/10
[52] U.S. Cl. ...................................... 385/132; 385/130; 385/141
[58] Field of Search ................. 385/14, 46, 129, 130, 385/131, 132, 122, 141; 372/6, 7, 21; 359/333, 342, 343

[56] References Cited

U.S. PATENT DOCUMENTS

| | | | |
|---|---|---|---|
| 4,087,159 | 5/1978 | Ulrich | 385/120 X |
| 4,693,546 | 9/1987 | Lorenzo et al. | 385/141 |
| 4,884,112 | 11/1989 | Lorenzo et al. | 357/17 |
| 4,993,034 | 2/1991 | Aoki et al. | 372/7 |
| 5,107,538 | 4/1992 | Benton et al. | 372/7 |
| 5,119,460 | 6/1992 | Bruce et al. | 372/6 |
| 5,140,658 | 8/1992 | Sunshine | 385/49 |
| 5,141,549 | 8/1992 | Tumminelli | 65/18.2 |
| 5,174,876 | 12/1992 | Buchal et al. | 427/526 |

Primary Examiner—Brian Healy
Attorney, Agent, or Firm—Herbert Dubno

[57] ABSTRACT

An optical electronic component, in which strip waveguides of limited depth and lateral width are formed in undoped dielectric substrate, e.g. an undoped crystal, by implantation of rare-earth ions or ions of transition metals, preferably laser-active ions with energies of 50 keV to 10 MeV.

3 Claims, 3 Drawing Sheets

OPTICAL WAVEGUIDE COMPONENT AND FORMED WITH RARE EARTH IONS

CROSS REFERENCE TO RELATED APPLICATION

This application is a division of Ser. No. 07/627,809 filed Dec. 14, 1990 (now U.S. Pat. No. 5,174,876 issued Dec. 29, 1992).

FIELD OF THE INVENTION

Our present invention relates to an optical component and a method of making same, an optical component being defined as an optical element which can be interposed in the path of a light beam for control of the light beam or transmission thereof, e.g. in conjunction with a communication system utilizing optical fibers or, in any event, transmitted light, in scientific instruments in which certain optical paths are to be created or are desirable and in like applications.

More particularly, the invention relates to the production of an optical component which can occupy a limited region of a substrate of dielectric material such that the optical path is defined or created by ion doping utilizing implantation.

The invention relates further to an optical component in which the optical path is a limited region defined by ion doping in a substrate of dielectric material (which may be crystalline or glass-like) and which can form an optical waveguide.

BACKGROUND OF THE INVENTION

It is known that one can bundle light passing through an optical material such as a crystal or glass, referred to generically herein as dielectric material. The channel through which the bundled light travels is referred to as an optical waveguide. Optical waveguides are described in the literature and can be formed generally by the diffusion of metal ions into dielectric substrate or by effecting an ion exchange with the dielectric substrate. The channels can be defined by masks applied by lithography in a manner similar to the manner in which conductive paths are formed or microelectronic technology or in which local doping creates electronic components.

Optical waveguides are desirable to provide light paths, generally without loss and without scattering between other components, e.g. between optical fibers or electro-optical components, for influencing the light in its bundled form, generally as to its intensity by modulation or attenuation of the light, etc.

When the light derives from certain atomic or ionic sources, the doping ions can amplify the intensity of the light by induced emission. In that case, the optical component may be a light amplifier. This effect is especially pronounced when the amplification takes place in a resonator bounded by reflectors. Such a device operates in accordance with the principles of a laser. The energy required for amplification is either supplied in an optical form (optical pumping) or can be supplied in the case of semiconductor lasers by electrical means. A process of this type is described in Electronics Letters 25, pages 985-986 (July 1989). In this system, a uniformly doped Nd:YAG crystal is provided with additional waveguides having a laser effect by helium implantation.

A work by Lallier et al, at the Integrated Optics and Optical Communication (IOOC) Conference at Kobe, Japan, July 1989, suggests that a Nd:MgO:LiNbO$_3$ crystal can be provided with a waveguide with the aid of proton exchange. In this case as well a laser effect is observed. These earlier methods for providing an additional waveguide have been limited to light-doping ions such as those of helium and with protons. With light-emission ions in an optical waveguide, therefore, it is possible to amplify selected intensities or construct a laser in the waveguide.

The use of rare-earth ions (e.g. Nd:YAG) or transition metal ions (for example Ti:Al$_2$O$_3$) as doping ions for the production of solid body lasers is known. However, their use has been limited to systems in which the dielectric crystal or glass is doped in the melt so that the entire crystal or glass body is more or less uniformly doped with the rare earth or transition metal ion.

Such uniformly doped laser crystals cannot, however, be utilized effectively in optical paths coupling further components in accordance with waveguide optical principles, such as modulators, light couplers, path branchers and the like, because in such massive components, the laser ions can give rise to undesirable absorption and scattering phenomenon. Furthermore, differently doped structures creating different optical paths are not possible in these systems.

For a number of reasons, therefore, it is advantageous that not the entire crystal body be formed as the amplifier and laser path but rather to limit the light to an optical waveguide of spatially limited character in the crystal body so that the lateral dimensions of the waveguide are comparable to those of optical fibers or waveguides to which the component is to be coupled so that the light can be received with greater precision from an optical fiber or can be delivered to an optical fiber of limited cross section.

A component having such a spatially limited optical waveguide has the following advantages.

1. Substantial reduction of the optical pumping power required.
2. Greater ability to influence the fields in the cavity for mode locking and cue switching.
3. Utilization of nonlinear characteristics for second harmonic generation, differential frequency formation or frequency summing.
4. Excellent capabilities for coupling of the component to other optical waveguides such as optical fibers.

OBJECTS OF THE INVENTION

It is, therefore, the principal object of the invention to provide a process for producing an optical component for the above-described purposes which can have a limited optical waveguide region in a dielectric substrate, i.e. a crystal or glass and which avoids drawbacks of earlier systems as described.

Another object of the invention is to provide a method of making an optical component so that it includes an optical waveguide of limited cross section extending along an elongated path through the substrate and in which the optical waveguide has improved laser characteristics.

Still another object of the invention is to provide an improved optical component having a limited optical waveguide formed therein with laser effect with improved ability to integrate that optical component with other optical components or to have that waveguide function in the optical component containing same with a plurality of laser waveguides and other devices for modulating, modifying, diverting or otherwise controlling the light beam in a single substrate in an optimal manner.

SUMMARY OF THE INVENTION

These objects and others which will become apparent hereinafter are attained, in accordance with the invention, in a method of making an optical component in which a substrate of dielectric material is formed with an optical waveguide of a spatially-limited configuration within that substrate by implanting as doping ions, rare-earth ions or ions of a transition metal with energies of 50 keV to 10 MeV in the region of the waveguide. The ions are thus implanted with an ion accelerator in the waveguide regions in sufficient concentration to a sufficient depth beneath the surface of the substrate but only to a limited part of the thickness thereof. Through the use of ion diffusion alone, a similar result cannot be reached.

More particularly, in a process for making an optical component, the improvement of the invention comprises the step of implanting in a dielectric optical component substrate over a laterally limited region thereof and in a generally elongate pattern, rare-earth ions or ions of a transition metal as doping elements at the aforementioned energy of 50 keV to 10 MeV, thereby forming a strip light-wave guide in the substrate.

The doping can be laterally limited with the use of lithographically-structured masks. The depth of the doping is limited by the implantation process itself and the energy selected.

If the ion implantation is carried out at substrate temperatures in the range of 300 K to 800 K, any lattice defects are healed during the implantation itself. In the case of rare-earth ions, there is practically no diffusion of the ions from the implantation regions to the remainder of the substrate so that the distribution of the doping ions is determined directly by the implantation energy.

In an alternative embodiment of the method, the ion implantation is carried out at substrate temperatures in the range of 77 K to 300 K. In this case, any lattice defects which may be formed are not healed by implantation. Especially in this alternative, the method of the invention can comprise a subsequent tempering of the substrate at a temperature of 800 K to 1800 K, which in effect is a heat treatment in which diffusion of the doping ions can occur. The lattice defects are found to be healed by this treatment.

Any remaining lattice defects following implantation can also be healed by solid body epitaxy. According to a further feature of this invention, additional light ions, for example, the ions of H, He or O can be implanted in the waveguide region of the substrate. This can result in lattice defects to greater depth and therefore a diffusion of the rare earth and transition metal doping ions to greater depths (radiation defects equal increased diffusion).

It has been found to be especially advantageous to provide spatially different regions of the substrate with spatially separated optical waveguides by the aforementioned implantation and dosing with rare earth and transition metal ions.

The different regions can be implanted with different ions or with different concentrations of the same ions or with different concentrations of different ions. This means that in a given, preferably nondoped mother crystal (for example a $LiNbO_3$ wafer or an optical glass) different laser ion doping regions can be produced at different locations so that lasers or amplifiers of different wavelengths and different constructions can be integrated on the same chip together with other optical components. The different constructions may involve lattice mirrors, lattice resonators, surface mirrors, coupled waveguides, intracavity modulated lasers and the like.

This highly advantageous combination of different laser doping zones, preferably with different concentrations, cannot be achieved with conventional diffusion doping because the ions necessary for the laser effect, especially the rare-earth ions, have too large atomic diameters for effective diffusion and cannot be significantly transferred by diffusion.

The optical component itself, therefore, is characterized by tracks of laterally limited regions forming optical waveguides with doping ions of rare earths and transition metals. These tracks may contain different doping ions or different doping ion concentrations and hence the optical component can be formed as an integrated optical solid-body laser or like amplifier.

BRIEF DESCRIPTION OF THE DRAWING

The above and other objects, features and advantages of the present invention will become more readily apparent from the following description, reference being made to the accompanying drawing in which.

SPECIFIC DESCRIPTION

Figure 1:
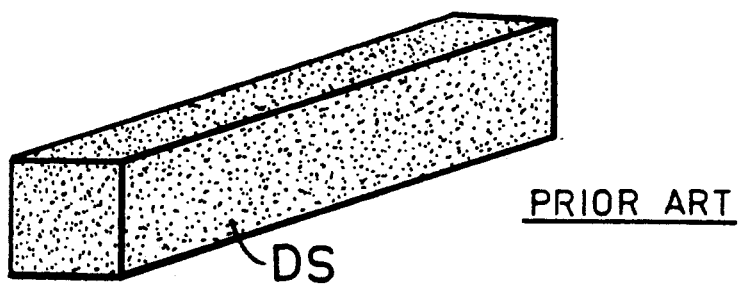
FIG. 1 is a perspective view of a homogeneously doped laser bar of prior art construction.

FIG. 1 shows a homogeneously doped substrate DS forming a laser rod or bar of conventional design. This component can consist of a YAG crystal, for example, which is doped with Nd ions. The doping is effected in the melt and hence the doping ions are distributed uniformly throughout the body.

Figure 2:
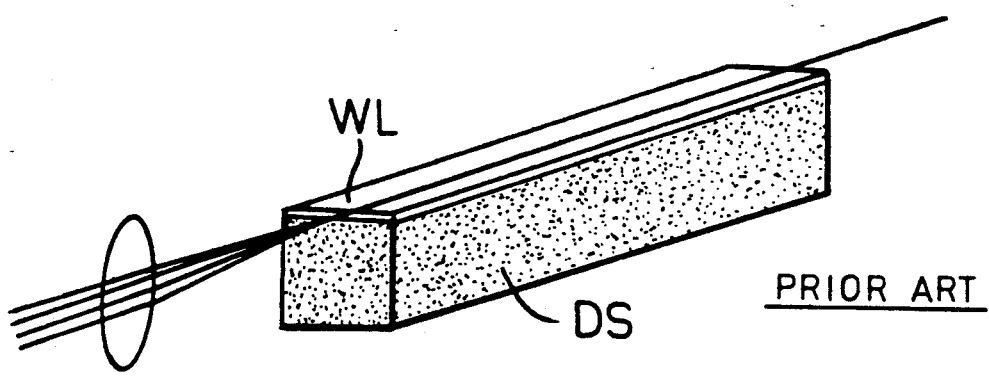
FIG. 2 is a similar diagram of a homogeneously doped laser rod having an additional waveguide formed on its upper surface.

Another type of conventional laser bar is that shown in FIG. 2 which is of the type described in the cited literature. Here the substrate DS is homogeneously doped but is additionally provided with a waveguide WL on a surface. The substrate DS can be the same material as in FIG. 1. Note that the waveguide WL is not laterally limited and generally is applied subsequently to the body.

Figure 3:
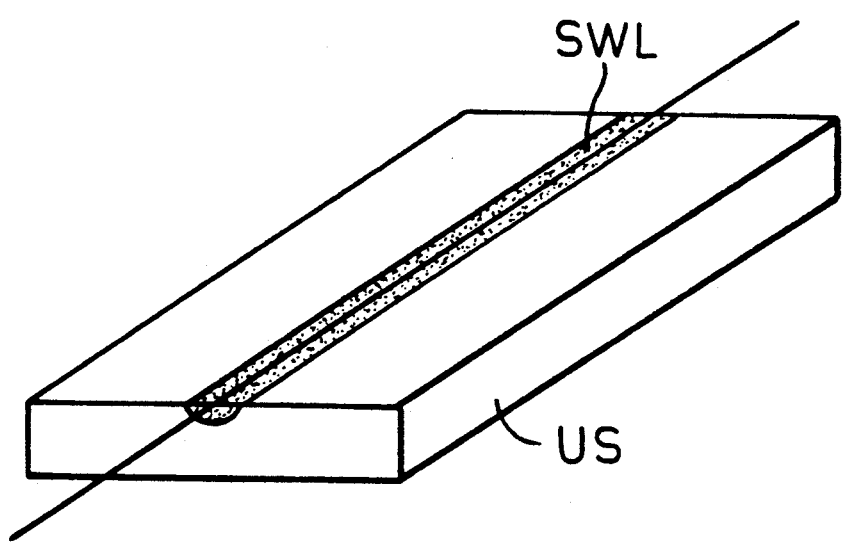
FIG. 3 is a perspective view showing the formation of a strip waveguide constituting a laser in an optical crystal according to the invention.

In FIG. 3 we have shown the principles of an optical component according to the invention in which an undoped substrate US, for example an $LiNbO_3$ crystal is formed by doping with a strip waveguide SWL by implantation with Er ions.

An optical component of this type may be formed as follows.

SPECIFIC EXAMPLE

In the $LiNbO_3$ crystal substrate, a laterally defined region is provided by the use of a titanium mask which is lithographically printed and etched to define the window through which ion implantation is to be effected. The titanium mask has a thickness of 1 micrometer.

Using an ion-beam accelerator, Er ions with an energy of 200 keV are implanted with a dose of $10^{16}$ $Er/cm^2$. The Er ions reach a depth of 70 to 80 nm. The titanium mask is then removed with a 5% HF acid solution.

The sample is then tempered at 1050° C. in dry air for 13 hours, whereupon the Er ions reach a depth of 1.5 to 2 micrometers. The strip waveguide can be subjected to titanium final diffusion, proton exchange or titanium implantation in addition, if desired.

Figure 4:
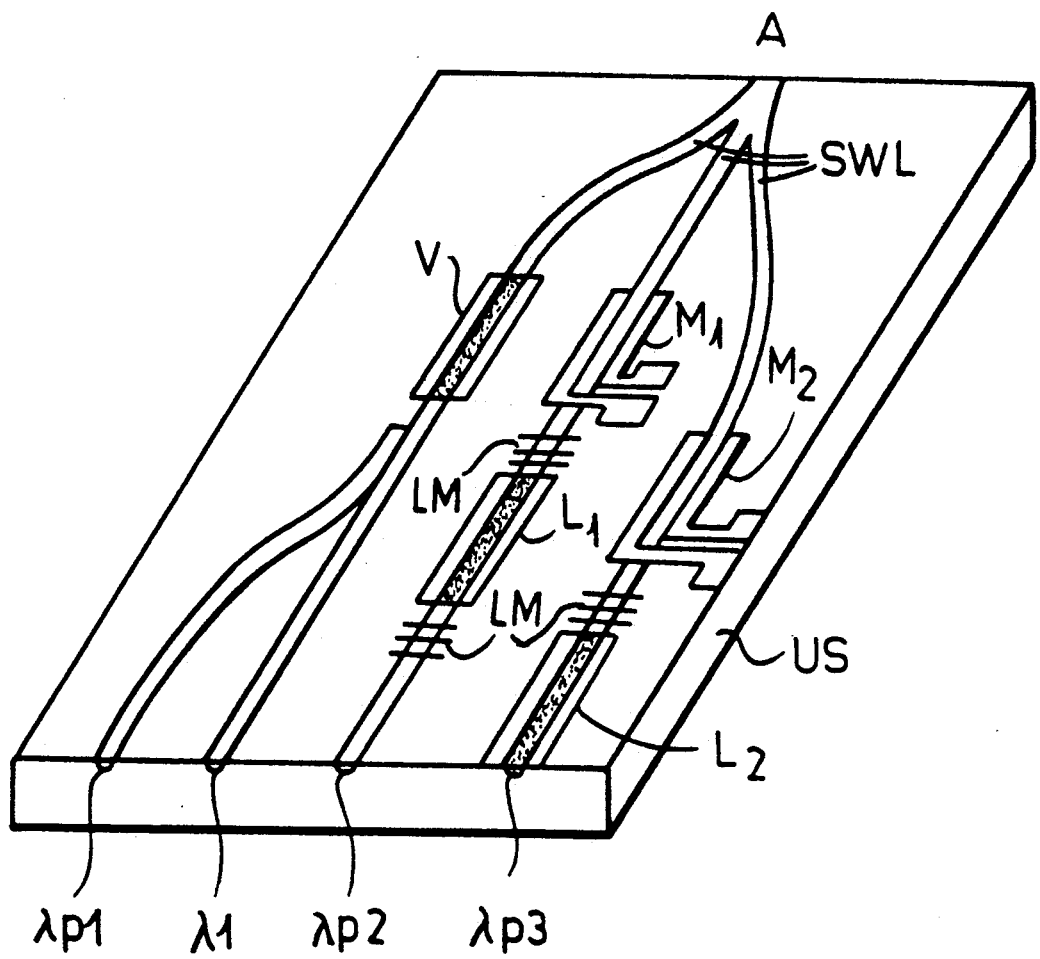
FIG. 4 is a similar diagram of an integrated optical amplifier of the invention having two lasers with external modulators for three frequencies.

In FIG. 4 we have shown an optical component which is formed with a number of strip waveguides SWL in the undoped substrate US, for example, a $LiNbO_3$ crystal. With laser-active ion doping, a region L1 of one of the strip waveguides SWL is constituted as a laser with two lattice mirrors while laser-active ions dope the region L2 to form a laser with one lattice mirror and one end-face mirror. The lattice mirrors are represented at LM in FIG. 4.

The doped region V of another one of the strip waveguides SWL is formed as an optical amplifier. Pumping light is fed, e.g. via optical fibers not shown, through the pumping light inputs λp1, λp2 and λp3. λ1 represents a light signal input. M1 and M2 are electro-optic modulators integrated on the chip US. At A, the strip waveguides SWL meet to provide a common output for all of the signals. In this integrated optical chip, at least the laser or amplifier regions VL1 and 2 are provided by ion implantation with laser-active rare earth and transition metal ions. Similar results to those described are obtained when titanium is implanted instead of europium in the specific example given.

Figure 5:
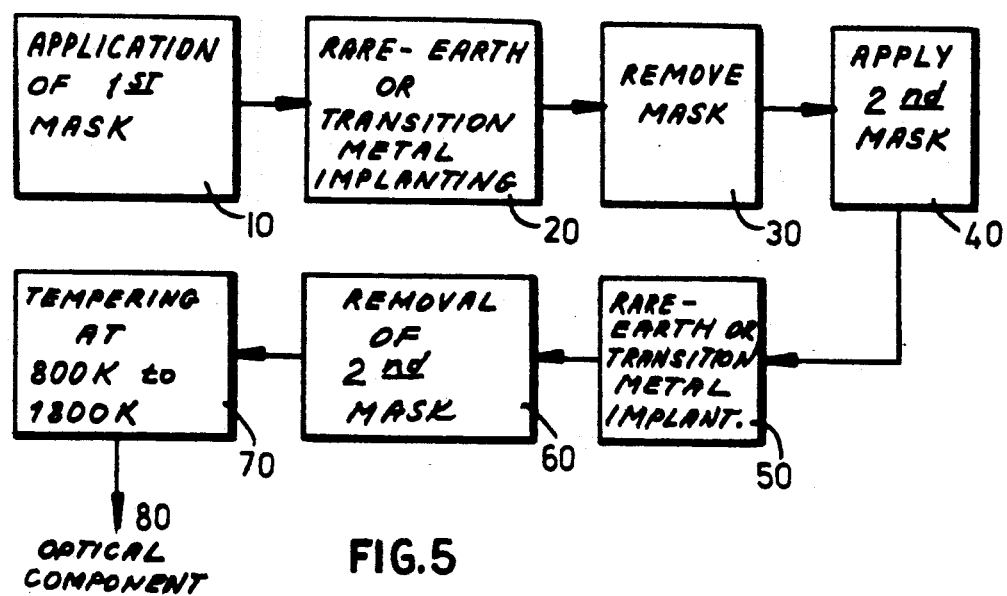
FIG. 5 is a block diagram of the method of the invention.
Figure 6A:
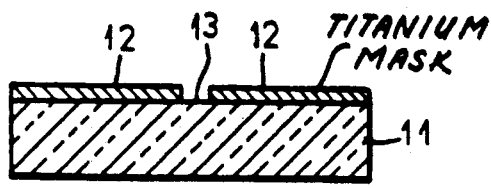
FIG. 6A–6E are cross sectional views showing successive steps in the fabrication of an optical component in accordance with the invention.
Figure 6B:
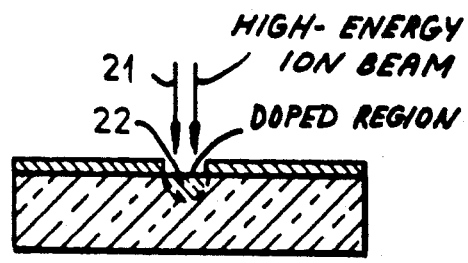

Turning now to FIG. 5, in which the spaces of the process have been set out pictorially, it can be seen that the undoped crystal first receives at 10 a first mask which can be treated to remove a portion thereof and define a window or can be so printed lithographically on the crystal to leave the window. For example in FIG. 6A, the crystal 11 is shown to have the mask 12 applied thereto leaving a window 13. The mask can be composed of titanium in the manner described. In the next step (FIG. 5) at 20, rare earth or transition metal ion implanting occurs utilizing (FIG. 6B) a high-energy ion beam 21 to form the doped region 22.

Figure 6C:
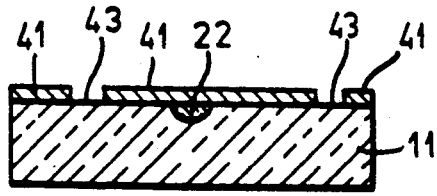
Figure 6D:
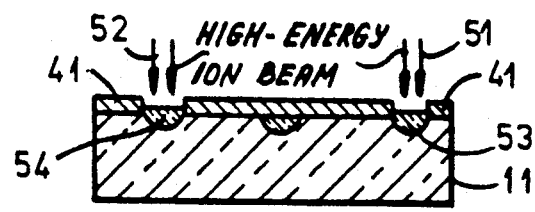
Figure 6E:
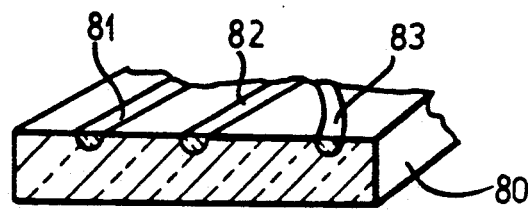

The mask is then removed at 30 (FIG. 5) by an acid treatment and a second mask is applied at 40. Referring to FIG. 6C, it can be seen that the mask 41 covers the doped region 22 and is formed with windows 43 through which the crystal 11 is exposed.

The masked crystal is then subjected at 50 (FIG. 5) to rare earth or transition metal ion implantation utilizing the high-energy ion beams 51 and 52 which may have different energies, and a different energy from the beam 21, may utilize the different rare earth or transition metal ions, or both, to form the implantation ions 53 and 54 in the crystal 11.

The second mask 41 is then removed at 60 (FIG. 5) by dissolving it with acid and the resulting product is tempered at 800K to 1800K at 70 to produce an optical component 80 (FIG. 6) which has the laser-active strip waveguides 81, 82 and 83.

We claim:

1. An optical component comprising:
   a body of a dielectric optical component substrate having a surface delimited by lateral edges and longitudinally spaced ends, said substrate being continuous between said ends; and
   a strip waveguide formed at said surface by rare-earth ions or ions of a transition metal implanted in said substrate as doping elements in a generally elongate pattern over a region of said surface spaced inwardly from said lateral edges and localized to only a limited portion of the full cross section of said body, said region being continuous with said body over an entire length of said strip waveguide.

2. The optical component defined in claim 1 wherein said substrate is formed at said surface with a plurality of mutually spaced apart laterally limited regions thereof spaced inwardly from said lateral edges and doped in respective elongate patterns with said rare-earth ions or ions of a transition metal as doping elements, thereby forming respective spaced apart strip light waveguides in said substrate, each of said regions being continuous with said body over an entire length of the respective strip waveguide.

3. The optical component defined in claim 2 wherein said regions have different ones of said ions implanted therein as doping elements.

* * * * *